United States Patent
Kim et al.

(10) Patent No.: US 9,704,215 B2
(45) Date of Patent: Jul. 11, 2017

(54) DISPLAY DEVICE AND METHOD FOR CONTROLLING PANEL SELF REFRESH OPERATION THEREOF

(71) Applicant: LG DISPLAY CO., LTD., Seoul (KR)

(72) Inventors: Jinsung Kim, Gyeongbuk (KR); Jincheol Hong, Gyeonggi-do (KR); Minki Kim, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 93 days.

(21) Appl. No.: 13/719,459

(22) Filed: Dec. 19, 2012

(65) Prior Publication Data
US 2013/0235055 A1 Sep. 12, 2013

(30) Foreign Application Priority Data
Mar. 9, 2012 (KR) ........................ 10-2012-0024451

(51) Int. Cl.
G06T 1/60 (2006.01)
G09G 5/00 (2006.01)
G09G 5/36 (2006.01)

(52) U.S. Cl.
CPC .............. *G06T 1/60* (2013.01); *G09G 5/006* (2013.01); *G09G 5/363* (2013.01);
(Continued)

(58) Field of Classification Search
CPC ........ G09G 5/363; G09G 5/006; G09G 5/395; G09G 2320/103; G09G 2330/022;
(Continued)

(56) References Cited

U.S. PATENT DOCUMENTS 5,778,411 A * 7/1998 DeMoss et al. .................. 711/4
2003/0174894 A1* 9/2003 Matherson ............. H04N 5/361
382/233

(Continued)

FOREIGN PATENT DOCUMENTS

CN 102280095 A 12/2011
KR 2003-0083070 A 10/2003
(Continued)

OTHER PUBLICATIONS

Office Action dated Mar. 26, 2015, from the Statement Intellectual Property Office of China in counterpart Chinese application No. 201210599086.5.
(Continued)

*Primary Examiner* — Xiao Wu
*Assistant Examiner* — Chong Wu
(74) *Attorney, Agent, or Firm* — Morgan, Lewis & Bockius LLP (57) ABSTRACT

A display device includes a source unit; and a sink unit connected with the source unit via an embedded display port interface for signal transmission between the source and sink units and to enable a panel self refresh (PSR) mode for reducing power, wherein, for an input still image, the source unit applies power to a frame buffer of the sink unit and transmits the still image to the sink unit, wherein the sink unit determines whether the still image can be losslessly compressed and stored in the frame buffer, outputs a first control signal if the still image can be losslessly compressed and stored in the frame buffer, and outputs a second control signal if the still image cannot be losslessly compressed and stored, and wherein the source unit activates the PSR mode for the first control signal, and deactivates the PSR mode for the second control signal.

10 Claims, 6 Drawing Sheets

(52) U.S. Cl.
CPC . *G09G 2320/103* (2013.01); *G09G 2330/022* (2013.01); *G09G 2340/02* (2013.01); *G09G 2360/18* (2013.01); *G09G 2370/04* (2013.01); *G09G 2370/045* (2013.01)

(58) Field of Classification Search
CPC ........... G09G 2340/02; G09G 2360/18; G09G 2370/04; G09G 2370/045; G06T 1/60
See application file for complete search history.

(56) References Cited

U.S. PATENT DOCUMENTS

| | | |
|---|---|---|
| 2010/0123727 A1 | 5/2010 | Kwa et al. |
| 2011/0285818 A1 | 11/2011 | Park et al. |
| 2011/0292059 A1 | 12/2011 | Kobayashi |
| 2012/0120083 A1* | 5/2012 | Kong ..................... G09G 5/003 345/545 |
| 2012/0206461 A1* | 8/2012 | Wyatt et al. .................. 345/501 |
| 2013/0187937 A1* | 7/2013 | Kerofsky et al. ............. 345/530 |
| 2013/0235941 A1* | 9/2013 | Koo et al. ................. 375/240.26 |

FOREIGN PATENT DOCUMENTS

| | | |
|---|---|---|
| KR | 10-2010-0056397 A | 5/2010 |
| KR | 10-2011-0128129 A | 11/2011 |

OTHER PUBLICATIONS

Craig Wiley, "The New Generation Digital Display Interface for Embedded Applications," Embedded DisplayPort Taipei, Taiwan, Dec. 6, 2010.

* cited by examiner

FIG. 1

(RELATED ART)

① : PSR on (1st frame)
② : Store in RFB
③ : PSR Cancel request
④ : PSR off (2nd frame)

DISPLAY DEVICE AND METHOD FOR CONTROLLING PANEL SELF REFRESH OPERATION THEREOF

This application claims the benefit of Korean Patent Application No. 10-2012-0024451, filed in Korea on Mar. 9, 2012, which is hereby incorporated by reference.

BACKGROUND OF THE INVENTION

Field of the Invention

This application relates to a display device, and more particularly, to a display device including a panel self refresh feature and a method for controlling a panel self refresh operation thereof.

Discussion of the Related Art

As display devices have become larger in size and higher in resolution, demand has risen for a high-performance interface that transmits signals between a video source and a display device. To cope with this demand, Vx1 is becoming a substitute for a TV, and a display port (DP) is becoming a substitute for a laptop in the case of IT products.

A display port (DP) interface is an interface regulated by Video Electronics Standards Association (VESA) and is an interface scheme which integrates LVDS (Low Voltage Differential Signaling), the existing internal interface standard, with DVI (Digital Visual Interface), an external connection standard. The DP interface can make not only a digital internal connection between chips, but also a digital external connection between products. As the two divided interfaces are integrated, higher color depth and resolution can be supported by widening data bandwidth. The DP interface has a bandwidth of up to 10.8 Gbps, which is twice or more than that of the existing DVI (maximum 4.95 Gbps), and can simultaneously transmit up to six streams of 1080i (three streams of 1080p) through one connector connection by supporting multi-streams using a micro-packet architecture.

Recently, VESA announced a new version of the embedded display port (eDP). eDP is a companion standard to the DP interface designed for embedded display applications, including notebook PCs, tablets, netbooks and all-in-one desktop PCs. eDP v1.3 includes a new panel self-refresh (PSR) technology that was developed to save system power and further extend battery life in portable PC systems. The PSR technology uses a memory mounted in a display to display an original image as it is while minimizing power consumption, thereby increasing battery usage time in portable PC systems.

Figure 1:
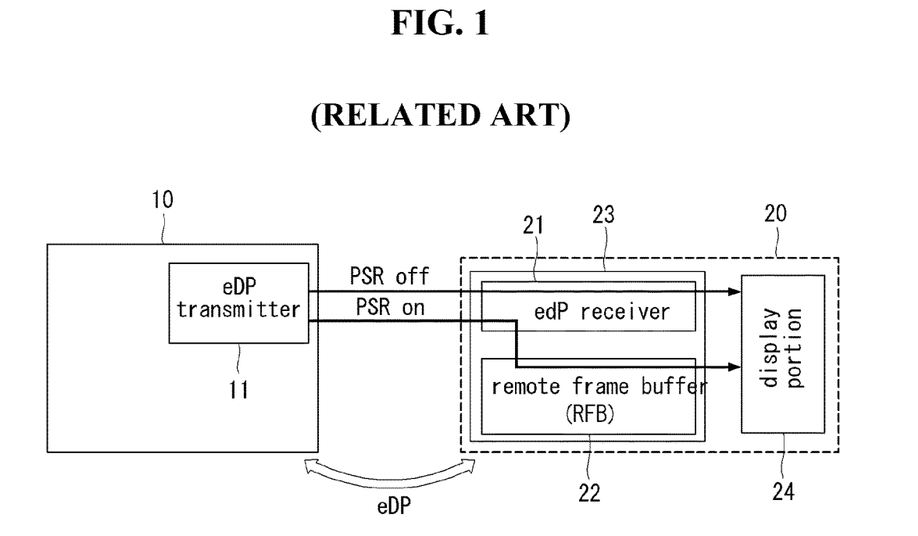
FIG. 1 is a block diagram illustrating an overview of the PSR technology included in edP v1.3.

FIG. 1 is an overview of the PSR technology included in edP v1.3.

As illustrated in FIG. 1, a display device capable of a PSR operation comprises a source unit 10 and a sink unit 20. The source unit 10 indicates a system, and comprises an eDP transmitter 11. The sink unit 20 indicates a panel portion, and comprises a timing controller 23 and a display unit 24. The timing controller 23 comprises an eDP receiver 21 and a remote frame buffer (RFB) 20. The source unit 10 and the synch unit 20 communicate with each other via an eDP interface.

The display device activates the PSR mode when a still image having no change in display is input, and deactivates the PSR mode in the case of video but not still images. When the PSR mode is activated, still image data is transmitted from the eDP transmitter 11 to the eDP receiver 21 and then is stored in the RFB 22. Then, the operating power of the source unit 10 is turned off, and the data store in the RFB 22 is applied to the display unit 24. Until the RFB 22 is updated with new still image data, the operating power of the source unit 10 remains in the OFF state, and the display unit 24 continues to display the data stored in the RFB 22. That is, when the PSR mode is activated, the display automatically remains the same by the data stored in the RFB 22 even when the working power of the source unit 10 is in the OFF state. This leads to reduced power consumption and increased battery usage time without the user's recognition.

Meanwhile, when the PSR mode is deactivated, data to be transmitted from the eDP transmitter 11 to the eDP receiver 21 is applied to the display unit 24 without being stored in the RFB 22, and the operating power of the source unit 10 continues to remain in the ON state. When the PSR mode is deactivated, power consumption is not reduced.

To perform the PSR mode, the RFB 22 needs to be mounted in the sink unit 20, as mentioned above. The RFB 22 is a component that should be added for the PSR mode, and hence causes a rise in manufacturing costs. Moreover, the PSR mode requires the system power to be turned on/off without the user's recognition (i.e., while the display remains the same). Thus, the original image data should not be lost when stored in the RFB 22. The size of the RFB 22 should be large enough to avoid loss of the original image. However, the use of a large-size RFB 22 will bring about a rise in manufacturing costs and makes it difficult to incorporate the RFB 22 in the sink unit 20, i.e., the timing controller 23.

A variety of lossless data compression methods can be taken into account as an alternative for reducing the size of the RFB 22 and preventing loss of an original image. Still, there has been no method capable of lossless compression of all images that are input within a limited hardware capacity.

SUMMARY OF THE INVENTION

Accordingly, the present invention is directed to a display device that substantially obviates one or more of the problems due to limitations and disadvantages of the related art.

An object of the present invention is to provide a display device, which comprises an eDP interface, and can reduce the size of a frame buffer mounted on a sink unit and prevent loss of an original image when the panel self refresh mode for saving power consumption is performed, and a method for controlling a panel self refresh operation thereof.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, a display device comprises a source unit; and a sink unit operatively connected with the source unit via an embedded display port (eDP) interface to provide signal transmission between the source unit and the sink unit and to enable a panel self refresh (PSR) mode for reducing power consumption, wherein, if an input image is a still image, the source unit applies operating power to a frame buffer of the sink unit and transmits data of the still image to the sink unit, wherein the sink unit determines whether or not the data of the still image can be losslessly compressed and stored in the frame buffer, outputs a first control signal if the data of the still image can be losslessly compressed and stored in the frame buffer, and outputs a second control signal if the data of the still image cannot be losslessly compressed and stored in the frame buffer, and wherein the source unit activates the panel self refresh mode in response to the first control signal, and deactivates the panel self refresh mode in response to the second control signal.

In another aspect, a method for controlling a panel self refresh (PSR) operation of a display device which provides signal transmission between a source unit and a sink unit via an embedded display port (eDP) interface and enables a panel self refresh mode for reducing power consumption, the method comprises analyzing an input image; if an input image is determined to be a still image in the analysis of the input image, applying operating power to a frame buffer of the sink unit and transmitting data of the still image from the source unit to the sink unit; determining whether or not the data of the still image can be losslessly compressed and stored in the frame buffer, outputting a first control signal if the data of the still image can be losslessly compressed and stored in the frame buffer, and outputting a second control signal if the data of the still image cannot be losslessly compressed and stored in the frame buffer; and activating the panel self refresh mode in response to the first control signal, and deactivating the panel self refresh mode in response to the second control signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings. Throughout the specification, the same reference numerals indicate substantially the same components. In connection with the description hereinafter, if it is considered that description of known functions or constructions related to the present invention may make the subject matter of the present invention unclear, the detailed description thereof will be omitted.

Figure 2:
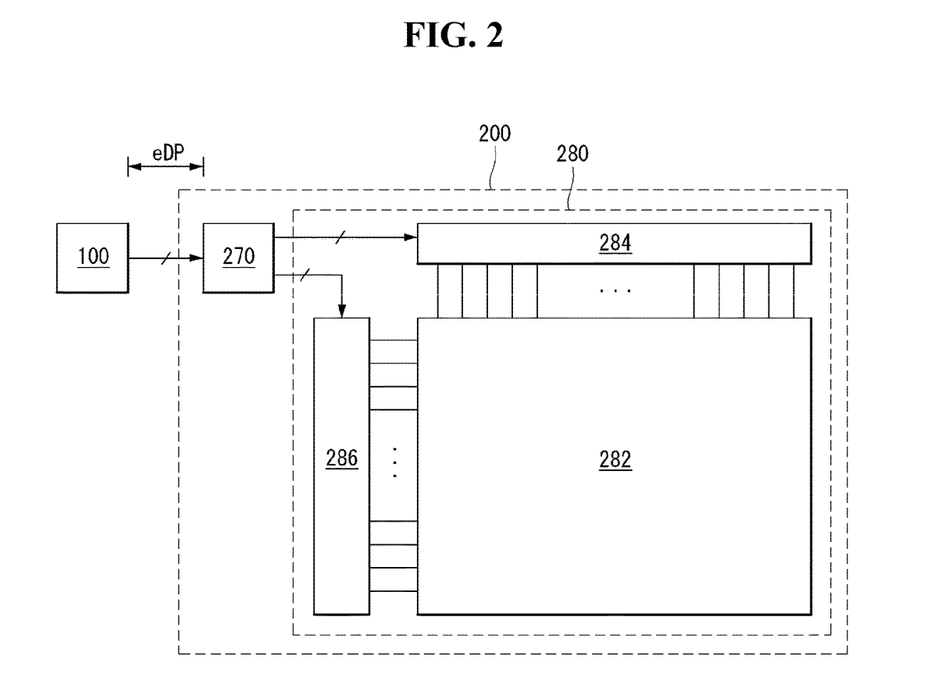
FIG. 2 is a schematic view showing a display device comprising an eDP interface according to an exemplary embodiment according to the present invention.

FIG. 2 is a schematic view showing a display device comprising an eDP interface according to an exemplary embodiment according to the present invention.

As illustrated in FIG. 2, the display device comprises a source unit 100 and a sink unit 200. The source unit 100 indicates a system, which may comprise an eDP transmitter. The sink unit 200 indicates a panel portion, which comprises a timing controller 270 and a display portion 280. The timing controller 270 comprises an eDP receiver, and also may comprise a remote frame buffer to enable the panel self-refresh (PSR) mode. The source unit 100 and the sink unit 200 communicate with each other via an eDP interface.

The source unit 100 transmits video data to the timing controller 270 included in the sink unit 200 through the eDP transmitter. The timing controller 270 receives video data through the eDP receiver, and applies the video data to the display portion 280. Moreover, the timing controller 270 generates timing control signals for controlling operation timings of driving circuits 284 and 286 included in the display portion 280. An interface for data transmission between the timing controller 270 and the data driving circuit 284 may be, but not limited to, a mini LVDS interface.

The display portion 280 may comprise a display panel 282, a data driving circuit 284, and a scan driving circuit 286. The display panel 282 is provided with data lines and scan lines (or gate lines) which intersect each other. The display panel 282 comprises pixels formed in a matrix, which are defined by the data lines and the scan lines. Thin film transistors (TFTs) may be formed at the intersections of the data lines and scan lines of the display panel 282. The display panel 282 may be implemented by a flat panel display, such as a liquid crystal display (LCD), a field emission display (FED), a plasma display panel (PDP), electroluminescence (EL) devices (e.g., inorganic or organic light emitting diodes), or an electrophoresis display (EPD). If the display panel 282 is an LCD display panel, a backlight unit is used. The backlight unit may be implemented, for example, by a direct type backlight unit or an edge type backlight unit.

The data driving circuit 284 latches digital video data under the control of the timing controller 270. The data driving circuit 284 converts the digital video data into data voltages which are output to the data lines. The scan driving circuit 286 sequentially supplies scan pulses synchronized with the data voltages to the scan lines under the control of the timing controller 270.

Figure 3:
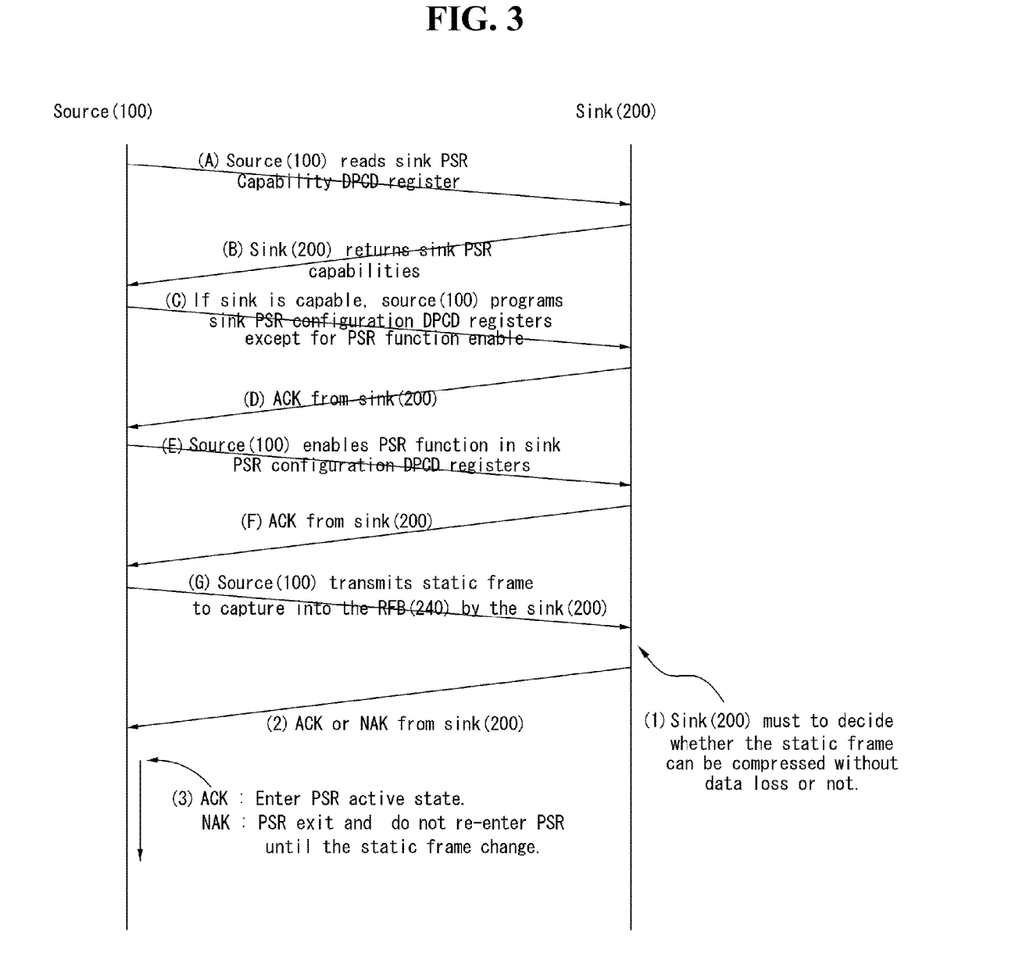
FIG. 3 is a flow diagram showing a schematic configuration for a PSR mode between the source unit and the sink unit of FIG. 2.

FIG. 3 shows a schematic configuration for a PSR mode between the source unit 100 and sink unit 200 shown in FIG. 2.

As illustrated in FIG. 3, the PSR mode between the source unit 100 and the sink unit 200 comprises a first configuration represented by operations (A) through (G) and a second configuration represented by operations (1) through (3).

The first configuration is included in eDP v1.3, and a preliminary check procedure for the PSR mode between the source unit 100 and the sink unit 200. The first configuration will be described below in detail. The source unit 100 reads a "sink PSR Capability DPCD (Display Port Configuration Data) register" included in the sink unit 200 to determine PSR capability (Operation A). The "sink PSR Capability DPCD register" records information indicating whether or not the sink unit 200 is capable of PSR. The sink unit 200 returns "sink PSR Capability" information to the source unit 100 based on a request from the source unit 100 (Operation B). After checking the "sink PSR Capability" information, the source unit 100 updates the "sink PSR Capability DPCD register" included in the sink unit 200 and sets up a state like "Source transmitter state in PSR active", "CRC verification in PSR active", and "Frame capture indication" (Operation C). When the update is done, the sink unit 200 transmits an "ACK" signal to the source unit 100 (operation D). Subsequently, the sink unit 200 activates the PSR function recorded in the "sink PSR configuration DPCD register" based on a request from the source unit 100, and then transmits an "ACK" signal to the source unit 100 (Operation E and F). The source unit 100 transmits still image data to the sink unit 200 to store it in the remote frame buffer (Operation G).

The second configuration is for reducing the size of the remote frame buffer for the PSR mode and preventing loss of the original image. The second configuration may be roughly divided into three operations.

For example, the sink unit 200 determines whether or not still image data input from the source unit 100, losslessly compressed, can be stored in the remote frame buffer without loss (Operation 1). The sink unit 200 performs the compression of input data based on a predetermined lossless compression algorithm. If the size of data compressed by the compression algorithm is equal to or less than the size of the remote frame buffer, the sink unit 200 determines that lossless compression and storage are possible, and if the size of data compressed by the compression algorithm exceeds the size of the remote frame buffer, the sink unit 200 determines that lossless compression and storage are impossible. At this point, the remote frame buffer to be mounted on the sink unit 200 has a smaller size than the size required to store uncompressed image information of one frame altogether in order to obtain size reduction.

The sink unit 200 selectively transmits an "ACK" signal and an "NAK" signal to the source unit 100 according to whether or lossless compression and storage are possible (Operation 2). If lossless compression and storage are possible, the sink unit 200 transmits the "ACK" signal, and otherwise, if lossless compression and storage are not possible, transmits the "NAK" signal to the source unit 100. When transmitting the "NAK" signal to the source unit 100, the sink unit 200 turns off the operating power supplied to the PSR-related elements (e.g., the remote frame buffer, a compressor, a recovery unit, etc.).

The source unit 100 determines whether to enable the PSR mode or not in response to the "ACK" signal and "NAK" signal input from the sink unit 200 (Operation 3). The source unit 100 activates the PSR mode in response to the "ACK" signal. That is, as the PSR mode is activated, the sink unit 200 stores compressed still image data in the remote frame buffer. Then, the operating power of the source unit 100 is turned off. In this state, the sink unit 200 recovers the compressed data stored in the remote frame buffer and then applies it to the display portion 280. Until the remote frame buffer is updated with new still image data, the sink unit 200 recovers the stored compressed data and continues to apply it to the display portion 280. Once the PSR mode is activated in this manner, the display automatically remains the same by the operation of the sink unit 200 alone even when the operating power of the source unit 100 is in the OFF state. This leads to reduced power consumption and increased battery usage time without the user's recognition.

Meanwhile, the source unit 100 deactivates the PSR mode in response to the "NAK" signal. The source unit 100 does not re-try the PSR mode on such data that the sink unit 200 determines cannot be losslessly compressed and stored, thereby preventing an unnecessary increase in power consumption.

Figure 4:
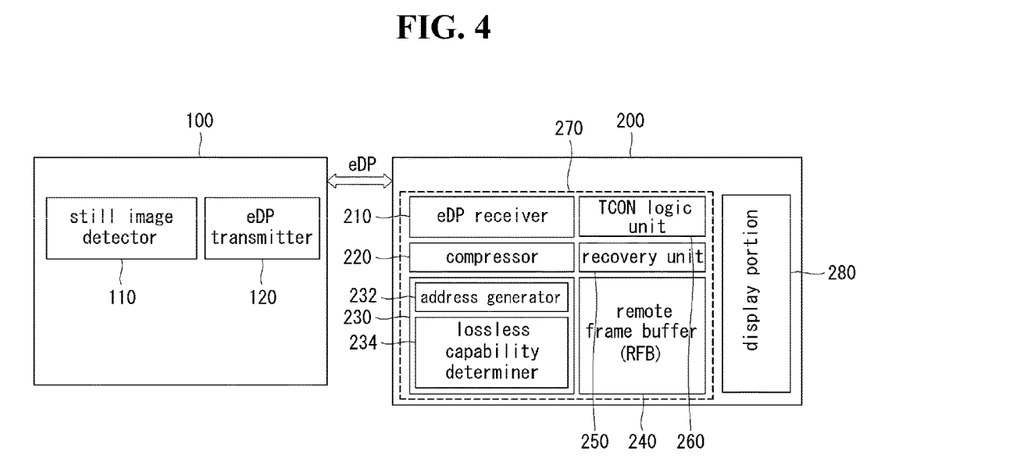
FIG. 4 is a block diagram showing detailed configurations of a source unit and a sink unit required for a PSR mode.

FIG. 4 shows detailed configurations of the source unit 100 and sink unit 200 required for the PSR mode.

The source unit 100 may comprise a still image detector 110 and an eDP transmitter 120. The still image detector 110 can detect a still image in a variety of methods. For example, the still image detector 110 compares consecutively input image data in units of frames. As a result of comparison, if a variation in image data between neighboring frames is less than a predetermined threshold value, the still image detector 110 can detect the current image as a still image. On the other hand, if the variation in image data between the neighboring frames is greater than the threshold value as the result of comparison, the still image detector 110 detects the current image as video. The source unit 100 may enter the PSR mode only when a still image is detected.

The eDP transmitter 120 processes signals to be transmitted to the sink unit 200 for the PSR mode according to the eDP interface standard, and then transmits them to the sink unit 200 via the eDP interface. Also, the eDP transmitter 120 may receive feedback about the signals associated with the PSR mode from the sink unit 200 via the eDP interface.

The sink unit 200 comprises the timing controller 270 and the display portion 280. The timing controller 270 may comprise the eDP receiver 210, the compressor 220, a PSR controller 230, the remote frame buffer (RFB) 240, the recovery unit 250, and a ICON logic unit 260.

The eDP receiver 210 is configured to correspond to the eDP transmitter 120, and is connected to the eDP transmitter 120 via the eDP interface. The eDP receiver 210 receives signals output from the eDP transmitter 120 via the eDP interface. Moreover, the eDP receiver 210 may give the eDP transmitter 120 feedback on the signals associated with the PSR mode via the eDP interface.

The compressor 220 receives still image data from the eDP receiver 210, and losslessly compresses the still image data using a stored compression algorithm. The lossless compression refers to a compression method in which an image recovered from a compressed image completely matches the original image (pre-compression image) as encoding and decoding processes are perfectly performed.

Lossy compression, in contrast with lossless compression, is a compression method which increases compression rate by eliminating redundant or less-important information from an image. Most image compression techniques are lossy. The lossy compression method uses a fixed compression ratio and involves compressing all data at a fixed compression ratio. According to the lossy compression method, a difference between original data and recovered data occurs during data recovery due to a compression loss. However, there may be no change in the display, caused by a data loss, in the PSR mode according to the present invention. That is, the system power may be turned on and off while the display continues to remain the same. As a result, the lossy compression method may not be applied to the present invention.

Lossless compression algorithms that can be used in the compressor 220 include "Run length encoding," "Huffman encoding," "Arithmetic encoding," etc. These lossless compression algorithms are more focused on complete data recovery than on data compression. With lossless compression, the compression ratio varies depending on images, and therefore the compression rate of a specific image may be significantly lowered.

The RFB 240 performs a memory function for storing data. The PSR operation is reduces power consumption. The RFB 240 is a component that should be added for the PSR mode. Although a larger size of the RFB 240 may be advantageous in preventing a display change during the PSR mode, this may lead to higher manufacturing costs. Raising the manufacturing costs without limit may not be of sufficient benefit to slightly reduce power consumption. Accordingly, the RFB 240 should be reduced in size such that it has a smaller size than the size required to store uncompressed image information of one frame altogether. The size of the RFB 240 may be limited such that it is 1/k (k is a real number greater than 1) of the required size. For example, if k is 3, the size of the RFB 240 may be reduced to at most ⅓ of the required size.

The PSR controller 230 controls whether to activate the PSR mode or not by comparing the size of compressed data with the size of the RFB 240. To this end, the PSR controller 230 may comprise an address generator 232 and a lossless capability determiner 234. The address generator 232 generates an address to store data compressed by the lossless compression algorithm in the RFB 240. This address specifies a position at which compressed data is to be stored in the RFB 240. The lossless capability determiner 234 determines whether the compressed data can be stored in the RFB 240 by comparing the size of the currently generated address with a predetermined maximum address size of the RFB 240. The size of the currently generated address indicates the size of the compressed data, and the maximum address size of the RFB 240 indirectly indicates the size of the RFB 240. Using address size in a comparison operation, size comparison is easily done even with a small amount of operation.

If the size of compressed data is less than the size of the RFB 240, the PSR controller 230 enables the RFB 240 and the recovery unit 250 in order to activate the PSR mode. On the other hand, if the size of compressed data exceeds the size of the RFB 240, the PSR controller 230 disables the RFB 240 and the recovery unit 250 to deactivate the PSR mode. The recovery unit 250 is enabled when the PSR mode is activated, and recovers the compressed data stored in the RFB 240.

The TCON logic unit 260 applies the recovered data to the display portion 280. On the other hand, when the PSR driving is deactivated, the TCON logic unit 260 may apply data input directly from the eDP receiver 210 to the display portion 280. The TCON logic unit 260 may generate control signals for controlling the driving circuits included in the display portion 280.

Figure 5:
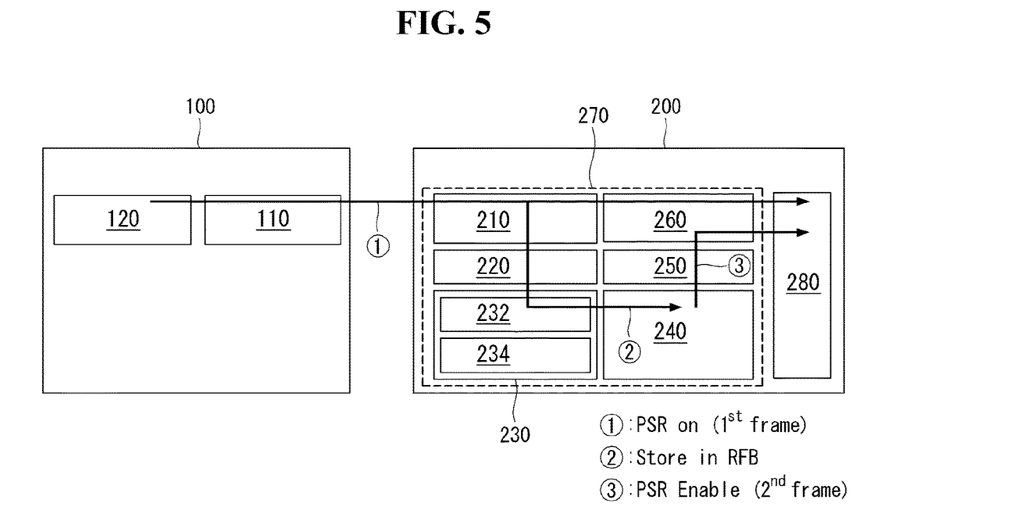
FIG. 5 is a block diagram showing the operation of the source unit and the sink unit when the PSR mode is activated.
Figure 6:
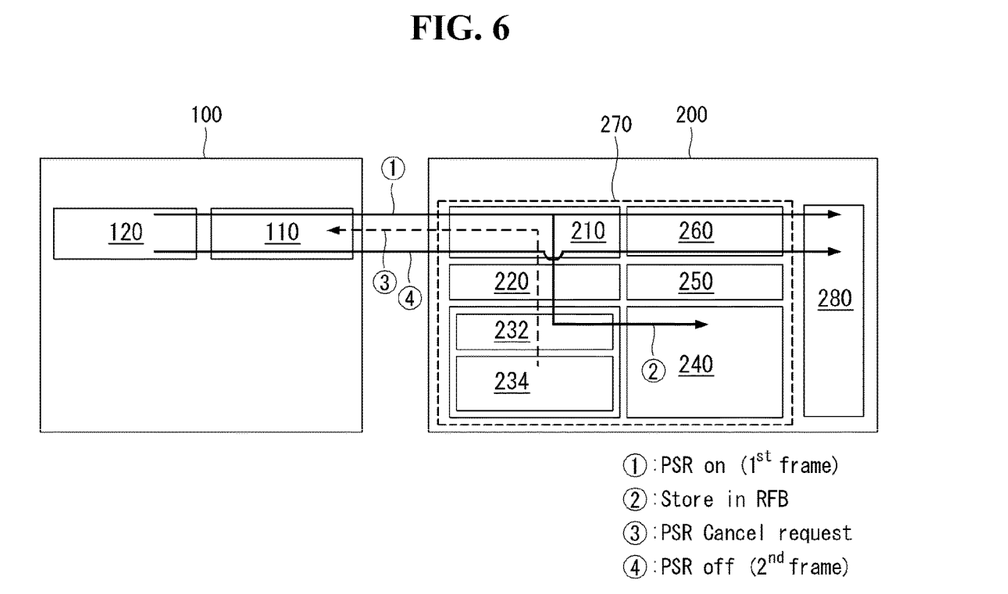
FIG. 6 is a block diagram showing the operation of the source unit and sink unit when the PSR mode is deactivated.
Figure 7:
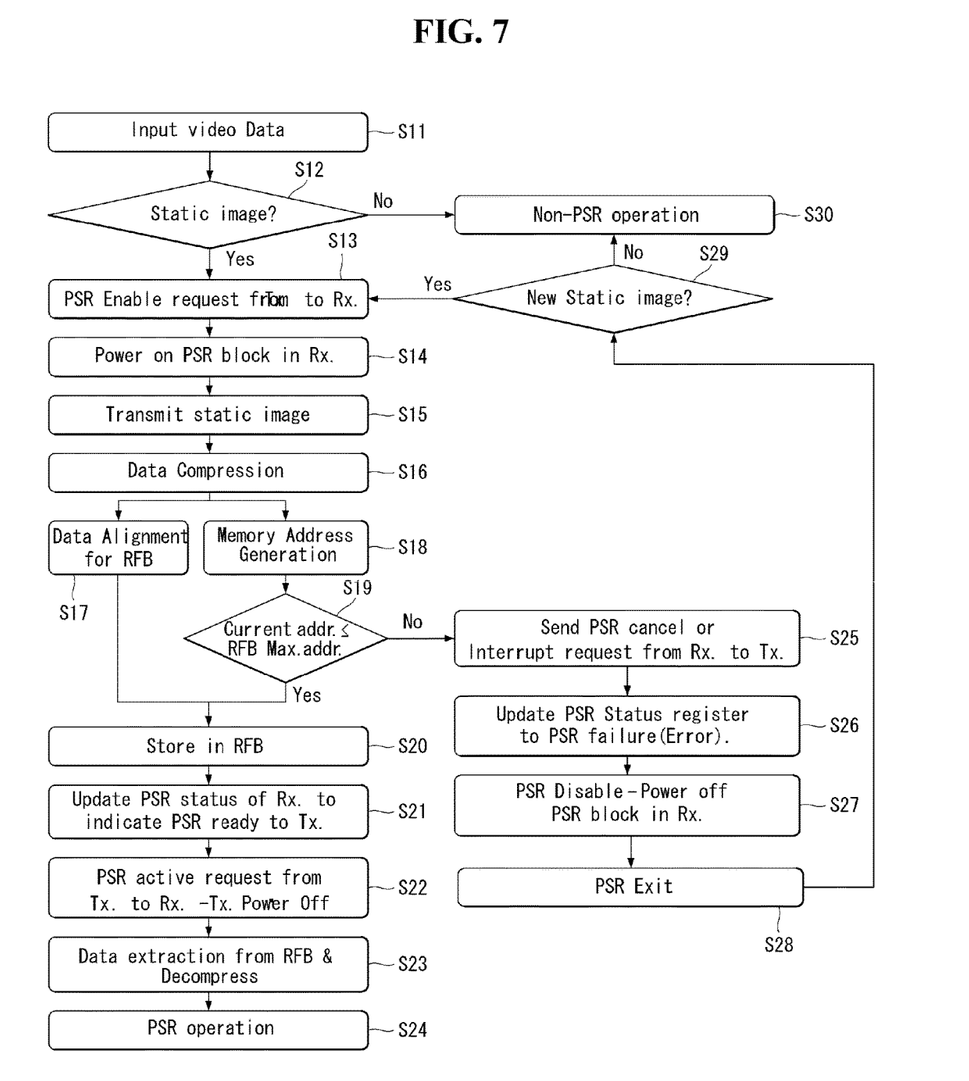
FIG. 7 is a flow chart showing the overall control procedure of the source unit and sink unit of FIGS. 5 and 6.

FIG. 5 shows the operation of the source unit 100 and the sink unit 200 when the PSR mode is activated. FIG. 6 shows the operation of the source unit 100 and sink unit 200 when the PSR mode is deactivated. FIG. 7 shows the overall control procedure of the source unit 100 and sink unit 200 of FIGS. 5 and 6. In FIG. 7, "Tx" indicates the source unit 100, and "Rx" indicates the sink unit 200. First, the operation of the source unit 100 and sink unit 200 when the PSR mode is activated will be described below with reference to FIGS. 5 to 7.

When image data is input, the source unit 100 detects a still image using the still image detector 110 (S11 and S121). When the still image is detected, the source unit 100 transmits a "PSR Enable" request signal to the sink unit 200 (S13). In response to the "PSR Enable" signal, the sink unit 200 applies operating power to the PSR-related elements (remote frame buffer, compressor, recovery unit, etc.) to turn on the PSR-related elements (S14). The source unit 100 transmits still image data to the sink unit 200 (S16). The sink unit 200 losslessly compresses still image data of the first frame input for the PSR mode through the compressor 220, and then stores the compressed data in the RFB 240. In this process, the PSR controller 230 of the sink unit 200 determines lossless capability by comparing the current address size for compression and storage with a predetermined maximum address size of the RFB 240 (S17 through S20). If the current address has a size equal to or less than the maximum address size of the RFB 240, the PSR controller 230 informs the source unit 100 that the PSR mode is ready, based on a determination that lossless compression and storage are possible (S21). The source unit 100 transmits a "PSR active" signal to the sink unit 200 to activate the PSR mode, and then the operating power applied to the source unit 100 is turned off (S22). When the PSR mode is activated, the sink unit 200 recovers the compressed data stored in the RFB 240 through the recovery unit 250 and applies it to the display portion 280, starting from the second frame subsequent to the first frame (S23 and S24).

Next, the operations of the source unit 100 and sink unit 200 when the PSR mode is deactivated will be described with reference to FIGS. 6 and 7.

When image data is input, the source unit 100 detects a still image using the still image detector 110 (S11 and S121). When the still image is detected, the source unit 100 transmits a "PSR Enable" request signal to the sink unit 200 (S13). In response to the "PSR Enable" signal, the sink unit 200 applies operating power to the PSR-related elements (remote frame buffer, compressor, recovery unit, etc.) to turn on the PSR-related elements (S14). The source unit 100 transmits still image data to the sink unit 200 (S16). The sink unit 200 losslessly compresses still image data of the first frame input for the PSR mode through the compressor 220, and then stores the compressed data in the RFB 240. In this process, the PSR controller 230 of the sink unit 200 determines lossless capability by comparing the current address size for compression and storage with a predetermined maximum address size of the RFB 240 (S17 through S20). If the current address has a size greater than the maximum address size of the RFB 240, the PSR controller 230 generates a "PSR Error or Interrupt" signal for requesting PSR cancellation, based on a determination that lossless compression and storage are possible (S25), and updates "PSR status field" with "PSR Error" information so that the source unit 100 can recognize the state of the sink unit 200 (S26). Subsequently, the sink unit 200 cuts off the operating power applied to the PSR-related elements (e.g., the remote frame buffer, compressor, recovery unit, etc.) to deactivate the PSR mode (S27 and S28). When the PSR mode is deactivated, the sink unit 200 applies the data transmitted from the source unit 100, starting from the second frame subsequent to the first frame, to the display portion 280 without compression and recovery processes. Such a non-PSR mode continues until a new still image is input (S29 and S30). The non-PSR mode is performed even when video is input.

When a new still image is input, the operation shown in FIG. 5 or FIG. 6 is repeated.

Figure 8:
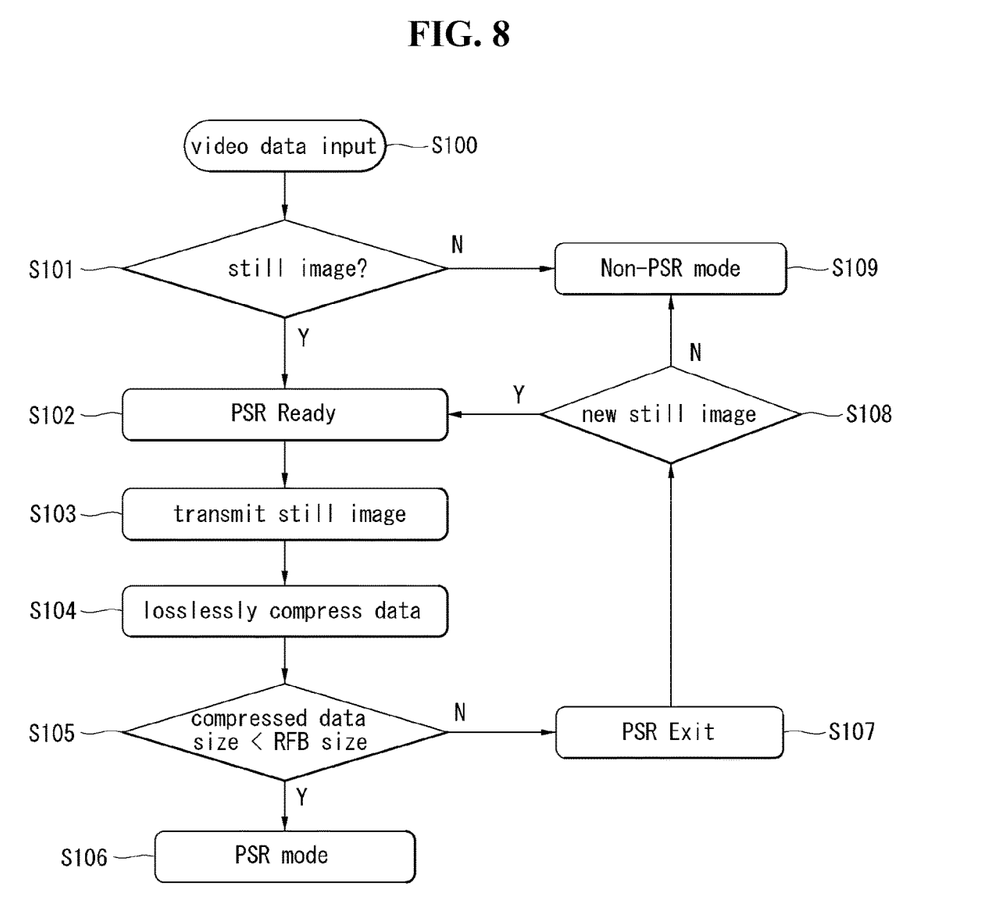
FIG. 8 is a flow chart sequentially showing a method for controlling a PSR operation of a display device according to an exemplary embodiment according to the present invention.

FIG. 8 sequentially shows a method for controlling a PSR operation of a display device according to an exemplary embodiment of the present invention.

With reference to FIG. 8, the method for controlling the PSR operation of the display device according to the present invention may comprise the following configuration for reducing the size of the RFB and preventing loss of the original image.

In the method for controlling the PSR operation of the display device according to the present invention, the source unit determines whether or not an input image is a still image by analyzing input video data (S100 and S101).

In the method for controlling the PSR operation of the display device according to the present invention, if the input image is a still image as a result of determination, operating power is applied to the PSR-related elements (RFB, compressor, recovery unit, etc.) included in the sink unit to turn on the PSR-related elements, and the still image data is transmitted from the source unit to the sink unit (S102 and S103).

In the method for controlling the PSR operation of the display device according to the present invention, the size of compressed data and the size of the RFB are compared in order for the sink unit to determine whether or not still image data, losslessly compressed, can be stored in the RFB without loss (S105). In the method for controlling the PSR operation of the display device according to the present invention, to simplify the comparison operation, an address may be generated to store losslessly compressed data in the RFB, and the address size may be compared with a predetermined maximum address size of the RFB.

In the method for controlling the PSR operation of the display device according to the present invention, if the size of losslessly compressed data is equal to or less than the size of the remote frame buffer, it is determined that lossless compression and storage are possible, and the sink unit transmits an "ACK" signal to the source unit. The source unit activates the PSR mode in response to the "ACK" signal (S106). As the PSR mode is activated, the operating power of the source unit is turned off. In this state, the sink unit recovers the compressed data stored in the RFB and then applies it to the display portion. Once the PSR mode is activated, the display automatically remains the same by the operation of the sink unit 200 alone even when the operating power of the source unit 100 is in the OFF state. This leads to reduced power consumption and increased battery usage time without the user's recognition.

In the method for controlling the PSR operation of the display device according to the present invention, if the size of data losslessly compressed by the compression algorithm exceeds the size of the RFB, it is determined that lossless compression and storage are impossible, and the sink unit transmits an "NAK" signal to the source unit and turns off the operating power supplied to the PSR-related elements (the remote frame buffer, a compressor, a recovery unit, etc.). The source unit deactivates the PSR mode in response to the "NAK" signal (S107). That is, the source unit does not re-try the PSR mode on such data (other than new still images) that the sink unit determines cannot be losslessly compressed and stored, thereby preventing an unnecessary increase in power consumption (S108 and S109).

As described above, in the display device and the method for controlling the panel self refresh operation thereof, a remote frame buffer is mounted which has a smaller size than the size required to store uncompressed image information of one frame, and it is determined whether or not an input image can be losslessly compressed and stored in the remote frame buffer. In the present invention, an input image is compressed by a lossless compression method in which the compression ratio varies depending on images. Thereafter, the PSR mode is performed only when the size of compressed data does not exceed the size of the remote frame buffer, and stops the PSR mode if the size of compressed data exceeds the size of the remote frame buffer. That is, even when lossless compression is performed, the PSR mode is denied if data loss is inevitable due to a low compression rate for some images within limited hardware. Accordingly, the panel self refresh mode for reducing power consumption can contribute to reducing the size of the frame buffer mounted on the sink unit and preventing loss of the original image.

It will be apparent to those skilled in the art that various modifications and variations can be made in the display device of the present invention without departing from the spirit or scope of the invention. Thus, it is intended that the present invention cover the modifications and variations of this invention provided they come within the scope of the appended claims and their equivalents.

What is claimed is:

1. A display device, comprising:
a source including an embedded display port (eDP) transmitter; and
a sink including a display portion, the sink operatively connected with the source via an eDP interface to provide signal transmission between the source and the sink and to enable a panel self refresh (PSR) mode for reducing power consumption,
wherein, in response to an input image being a still image, the source applies operating power to a frame buffer of the sink and transmits data of the still image to the sink,
wherein the sink losslessly compresses the data of the still image and determines the size of the compressed data,
wherein the sink:
determines whether or not the compressed data of the still image has a size that can be stored in the frame buffer by comparing the size of the compressed data of the still image with a predetermined size of the frame buffer,
outputs a first control signal to the source if the compressed data of the still image has a size that can be stored in the frame buffer, based on the comparing of the size, and
outputs a second control signal to the source if the compressed data of the still image has a size that cannot be stored in the frame buffer, based on the comparing of the size,
wherein the source:
receives one of the first and second control signals from the sink,
activates the panel self refresh mode in response to the first control signal, and
deactivates the panel self refresh mode in response to the second control signal,
wherein the source activates the panel self refresh mode when the size of the compressed data of the still image is less than or equal to the size of the frame buffer,
wherein the source deactivates the panel self refresh mode when the size of the compressed data of the still image is greater than the size of the frame buffer,
wherein the sink further includes:
a lossless capability determiner to determine whether or not the compressed data can be stored in the frame buffer by comparing a size of an address to store the compressed data with a predetermined maximum address size of the frame buffer;
a compressor to losslessly compress the data of the still image by a lossless compression algorithm; and a recoverer to be enabled when the panel self refresh mode is activated, and to recover the compressed data stored in the frame buffer, and wherein, if the panel self refresh mode is deactivated:

the sink turns off the operating power for elements that perform the panel self refresh mode, the elements including the compressor, the frame buffer, and the recoverer.

2. The display device of claim 1, wherein the frame buffer has a smaller size than a size required to store information of one frame of the still image in an uncompressed format without loss.

3. The display device of claim 1, wherein:

if the panel self refresh mode is activated, the operating power of the source is turned off; and the sink stores the compressed data of the still image in the frame buffer, and recovers the compressed data stored in the frame buffer and applies the same to the display portion for image display when the operating power of the source is off.

4. The display device of claim 3, wherein, if the panel self refresh mode is deactivated:

the sink applies the data of the still image input from the source to the display portion for image display without the compression, storage, and recovery processes; and the source does not re-try the panel self refresh mode on such data that the sink determines cannot be losslessly compressed and stored.

5. The display device of claim 1, wherein the sink further comprises:

a PSR controller to control whether to activate the panel self refresh mode or not by comparing the size of the compressed data of the still image, compressed by the lossless compression algorithm, with the predetermined size of the frame buffer.

6. The display device of claim 5, wherein the PSR controller comprises:

an address generator to generate the address to store the data compressed by the lossless compression algorithm in the frame buffer; and the lossless capability determiner.

7. A method for controlling a panel self refresh (PSR) operation of a display device which provides signal transmission between a source unit and a sink unit via an embedded display port (eDP) interface and enables a panel self refresh mode for reducing power consumption, the method comprising:

analyzing an input image;

in response to an input image being determined to be a still image in the analysis of the input image, applying operating power to a frame buffer of the sink unit and transmitting data of the still image from the source unit to the sink unit;

losslessly compressing the data of the still image and determining the size of the compressed data;

determining whether or not the compressed data of the still image has a size that can be stored in the frame buffer by comparing the size of the compressed data of the still image with a predetermined size of the frame buffer;

outputting a first control signal to the source unit if the compressed data of the still image has a size that can be stored in the frame buffer, based on the comparing of the size;

outputting a second control signal to the source unit if the compressed data of the still image has a size that cannot be stored in the frame buffer, based on the comparing of the size; and activating the panel self refresh mode in response to the first control signal from the sink unit; and deactivating the panel self refresh mode in response to the second control signal, wherein the source unit activates the panel self refresh mode when the size of the compressed data of the still image is less than or equal to size of the frame buffer, wherein the determination of whether or not the data of the still image can be losslessly compressed and stored in the frame buffer includes:

generating an address to store the data compressed by the lossless compression algorithm in the frame buffer, and determining whether or not the compressed data can be stored in the frame buffer by comparing the size of the current generated address with a predetermined maximum address size of the frame buffer, and wherein, if the panel self refresh mode is deactivated, the sink unit turns off the operating power for elements that perform the panel self refresh mode, the elements including:

the frame buffer;

a compressor to losslessly compress the data of the still image by a lossless compression algorithm; and a recoverer to be enabled when the panel self refresh mode is activated, and to recover the compressed data stored in the frame buffer.

8. The method of claim 7, wherein the frame buffer has a smaller size than a size required to store information of one frame of the still image in an uncompressed format without loss.

9. The method of claim 7, wherein:

if the panel self refresh mode is activated, the operating power of the source unit is turned off; and the sink unit stores the compressed data of the still image in the frame buffer, and recovers the compressed data stored in the frame buffer and applies the same to the display portion for image display when the operating power of the source unit is off.

10. The method of claim 9, wherein, if the panel self refresh mode is deactivated, the sink unit applies the data of the still image input from the source unit to the display portion for image display without the compression, storage, and recovery processes, and the source unit does not re-try the panel self refresh mode on such data that the sink unit determines cannot be losslessly compressed and stored.

* * * * *